(12) United States Patent
Nishimura et al.

(10) Patent No.: US 8,339,681 B2
(45) Date of Patent: Dec. 25, 2012

(54) IMAGE READING METHOD FOR SHEET MEDIA AND A SHEET MEDIA PROCESSING DEVICE

(75) Inventors: Hideki Nishimura, Nagano-ken (JP); Takashi Saikawa, Nagano-ken (JP); Masanori Hayashi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1156 days.

(21) Appl. No.: 12/198,619

(22) Filed: Aug. 26, 2008

(65) Prior Publication Data

US 2009/0091804 A1    Apr. 9, 2009

(30) Foreign Application Priority Data

Oct. 5, 2007   (JP) ................................. 2007-261668

(51) Int. Cl.
*H04N 1/04* (2006.01)
*H04N 1/00* (2006.01)
*G06K 15/00* (2006.01)
*G03G 15/00* (2006.01)

(52) U.S. Cl. ....... 358/474; 358/498; 358/406; 358/1.12; 358/496; 399/388

(58) Field of Classification Search .................. 358/474, 358/498, 406, 1.12, 496; 399/388
See application file for complete search history.

(56) References Cited

U.S. PATENT DOCUMENTS

| | | | |
|---|---|---|---|
| 7,027,194 B2 | 4/2006 | Kanda | |
| 2004/0247354 A1* | 12/2004 | Newell et al. | 399/388 |
| 2007/0291328 A1* | 12/2007 | Furihata et al. | 358/498 |

FOREIGN PATENT DOCUMENTS

| | | |
|---|---|---|
| JP | 04-367985 A | 12/1992 |
| JP | 09-247386 A | 9/1997 |
| JP | 2000295434 | 10/2000 |
| JP | 2002084404 | 3/2002 |
| JP | 2002-111977 A | 4/2002 |
| JP | 2007137035 | 6/2007 |

* cited by examiner

*Primary Examiner* — Charlotte M Baker
*Assistant Examiner* — Rury Grisham

(57) ABSTRACT

The first reading start point D of a front contact image sensor 21 and the second reading start point F of a back contact image sensor 22 are managed using a previously measured sensor-to-sensor distance L. As a result, even if there is a difference in the distance between the sensors, the first and second reading start points D and F will still be a first margin length L1 before the image reading positions A and B of the contact image sensors 21 and 22. Because the beginning of the front image information FD2 and the beginning of the back image information BD2 contained in the back-side image data BD1 in the images captured by the contact image sensors 21 and 22 match, the front image information FD2 can be extracted based on the coordinates of the back image information BD2 contained in the back-side image data BD1.

8 Claims, 8 Drawing Sheets

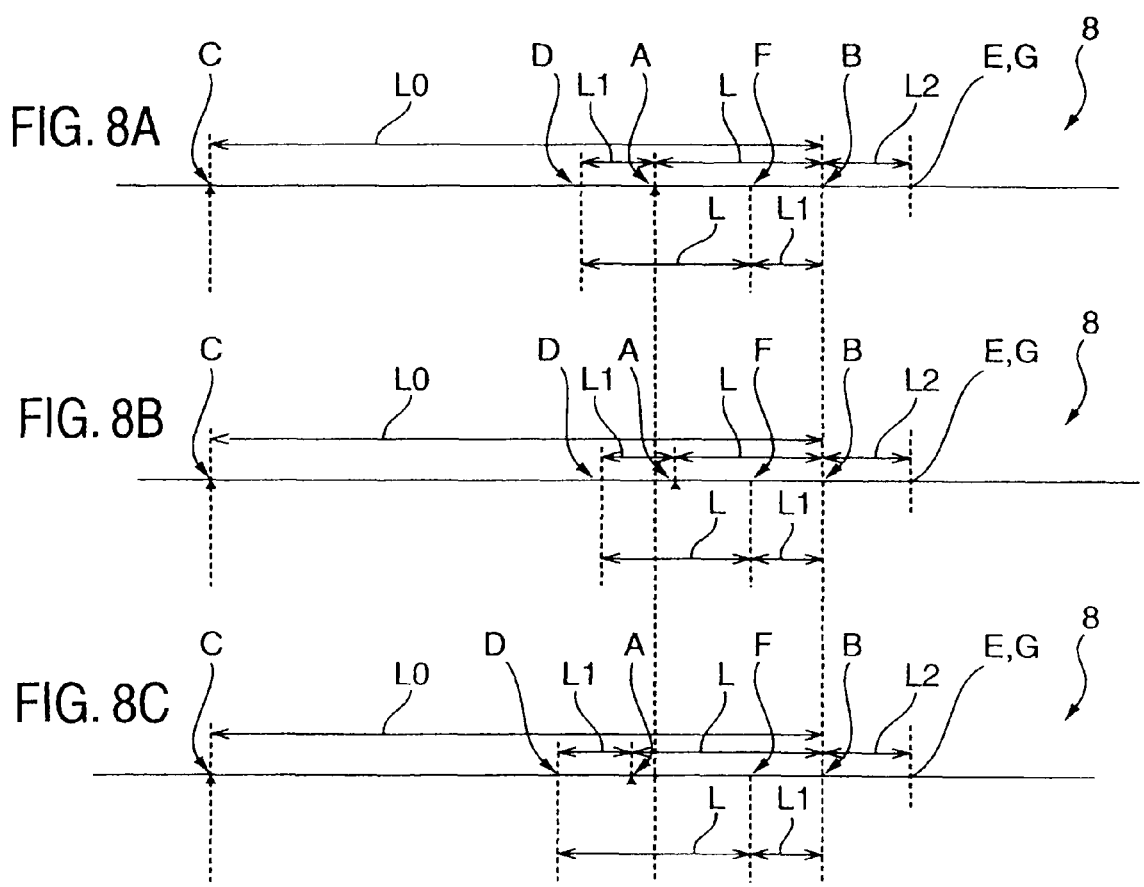

IMAGE READING METHOD FOR SHEET MEDIA AND A SHEET MEDIA PROCESSING DEVICE

CROSS-REFERENCE TO RELATED APPLICATIONS

Japanese Patent application No. 2007-261668, filed Oct. 5, 2007, is hereby incorporated by reference in its entirety.

BACKGROUND

1. Field of Invention

The present invention relates to a sheet media processing device that images the front and back sides of sheet media such as checks while conveying the sheet media one at a time through a transportation path.

More particularly, the invention relates to a sheet media image reading method that uses a front image sensor and a back image sensor disposed at offset positions along the transportation path to capture front-side image data containing image information on the front of the sheet medium and back-side image data containing image information on the back of the sheet medium, and then accurately extracts the front and back image information from the front-side image data and back-side image data. The invention also relates to a sheet media processing device and sheet media processing system that use this method.

2. Description of Related Art

Check processing devices for processing checks and similar instruments (collectively referred to below as simply checks) are one type of sheet media processing device that images the front and back sides of sheet media. In retail stores as well as banks and other financial institutions, received checks are loaded into a check processing device to read the printed magnetic ink characters and image the front and back sides for transaction processing. The electronic image data captured from the front and back sides is processed by the store or financial institution so that it can be used as the equal of the actual check, and the actual check is returned to the person that presented the check (the presenter). A magnetic head, a front image sensor, and a back image sensor in the check processing device read the magnetic ink characters and capture the front and back images while the checks are conveyed one at a time through the transportation path.

If the front image sensor and back image sensor are positioned opposite each other on the opposite sides of the transportation path, part of the light emitted for imaging by the image sensor on one side will stray and affect imaging by the other image sensor. If contact image sensors are used, a pressure roller for pressing the conveyed check to the image sensor surface must be disposed opposite each image sensor on the other side of the transportation path. As a result, Japanese Unexamined Patent Appl. Pub. JP-A-2007-137035 teaches a check processing device that has the front image sensor and back image sensor disposed on opposite sides of the transportation path at positions offset (shifted) from each other in the transportation direction.

Because the image sensors read images of the checks as the checks pass by, the image sensors may not be able to accurately image the leading end or trailing end parts of the check, and some of the check image data may be lost. This can be avoided by starting the imaging operation before the check reaches the reading position of each image sensor, and continuing to read until after the trailing end has passed the reading position. More specifically, if the reading operation continues from positions beyond the leading end and trailing end of the check, image data for the entire check can always be captured. Because the entire check is thus included, image data that contains a margin at the leading end and the trailing end of the check is acquired from each image sensor. This margin is read from parts of the transportation path where the check is not present, and the image in this margin is darker than the images captured from the check. The margin can then be removed by extracting the portion of the captured image data where the brightness is greater than or equal to a predetermined level, and images of only the front and back sides of the check can thus be acquired.

However, checks are also printed with a wide variety of background designs on the surface. Some designs include a dark colored border or decoration at the leading end and trailing end of the check. If an image processing operation that extracts the surface image data of the check based on the image brightness is applied to the image data acquired from the front of such checks, the border around the front of the check may be incorrectly determined to be part of the margin instead of part of the desired check image, resulting in only the image inside the border being extracted as the front-side image data. Note that this type of border or decorative image is not generally printed at the leading and trailing ends on the back side of the check.

In this situation the extracted front image of the check is smaller than the back image by the size of the border or decoration that is identified as part of the margin. If the front image and back image are different sizes, the images are not considered to be authentic images of the front and back of the check, and the resulting images cannot be used as legal equivalents of the actual check. In order to accurately extract the front image of the check, the size of the front image can be referenced to the size of the back image of the check where the background design is not printed. The front image of the entire check including the border can be extracted from the front-side image data based on the coordinates of the back image acquired by writing the back image to memory.

As described above, the front image sensor and the back image sensor are disposed at offset positions in the transportation direction. Information about these known, fixed offset positions can be stored in the check processing device. However, if there is any deviation in the distance between the front image sensor and the back image sensor and the front image information contained in the front-side image data is extracted based on the coordinates of the back image information contained in the back-side image data, the position of the extracted image will be shifted by an amount equal to the deviation in the sensor-to-sensor distance. As a result, the extracted front image will be cut off at one end and contain part of the margin at the other end. The resulting front image information is thus deficient, and cannot be used as the equal of the actual check.

SUMMARY OF INVENTION

The sheet medium image reading method according to at least one embodiment of the invention enables acquiring accurate images of the front and back sides of a check without being affected by deviation in the sensor-to-sensor distance between the front image sensor and the back image sensor.

A sheet media processing device and sheet media processing system according to at least one embodiment of the invention use this sheet medium image reading method to the same effect.

A sheet medium image reading method according to a first aspect of at least one embodiment of the invention has steps including measuring and storing a sensor-to-sensor distance between a first image sensor disposed to a transportation path in which the sheet medium is conveyed and a second image sensor disposed to the transportation path downstream from the first image sensor; setting a point before the sheet medium reaches the first image sensor as a first reading start point; setting a point that is before the sheet medium reaches the second image sensor and is after the sheet medium is conveyed the sensor-to-sensor distance from the first reading start point as a second reading start point; capturing first image information containing a first side of the sheet medium from the first reading start point by means of the first image sensor; and capturing second image information containing a second side of the sheet medium from the second reading start point by means of the second image sensor.

By using a measured sensor-to-sensor distance, this aspect of at least one embodiment of the invention can make the starting position of a first-side image in the first image information and the starting position of a second-side image in the second image information the same position even if there is deviation in the sensor-to-sensor distance between the first image sensor and the second image sensor due to error or difference in the parts or assembly. More specifically, the margin at the leading end of both images can be made the same.

Preferably, the sheet medium image reading method also has steps of: setting a point after the sheet medium has finished passing (has moved beyond) the second image sensor as a first reading end point and a second reading end point; capturing first image information containing a first side of the sheet medium from the first reading start point to the first reading end point by means of the first image sensor; capturing second image information containing a second side of the sheet medium from the second reading start point to the second reading end point by means of the second image sensor; and removing a sensor-to-sensor distance portion of image information from an area not including the first-side image information in the first image information.

Control is simple in this aspect of at least one embodiment of the invention because the first image sensor and second image sensor stop reading at the same time. In addition, the end of the first-side image in the first image information and the end of the second-side image in the second image information can be made the same position even if there is deviation in the sensor-to-sensor distance by using the measured sensor-to-sensor distance to remove the sensor-to-sensor distance portion of image information from the area not including the first-side image information in the captured first image information. More specifically, the margin at the trailing end can be made the same in the image information for both sides.

In addition, because the leading end margin is also the same in both image areas, the first-side image area and the second-side image area can be accurately identified. Based on these areas, the image information for both sides can also be accurately extracted.

In the sheet medium image reading method according to another aspect of at least one embodiment of the invention the first-side image information in the first image information or the second-side image information in the second image information is identified by extracting image information with at least a prescribed brightness level.

If the sheet medium slips in the transportation path so that the first-side image area in the first image information or the second-side image area in the second image information shifts, this aspect of at least one embodiment of the invention can still correctly identify the desired image area based on the brightness of the image area captured from the sheet medium.

Yet further preferably, the sensor-to-sensor distance is measured by reading a prescribed sheet medium.

This aspect of at least one embodiment of the invention enables accurately measuring the sensor-to-sensor distance by using a check with no shading or background design printed in at least the leading end portion and trailing end portion of the check, or by using a white or solid color check with no background pattern, to measure the sensor-to-sensor distance.

If the sensor-to-sensor distance between the first image sensor and second image sensor varies due to differences or error in the parts or assembly, this aspect of at least one embodiment of the invention enables correcting the captured image information by using the measured sensor-to-sensor distance. The length of the check can also be identified, and the margins at the leading end and trailing end contained in the images captured by the image sensors can be identified. As a result, based on the sensor-to-sensor distance and the image area on one side of the sheet medium contained in the image captured by one image sensor, the image area on the other side of the sheet medium contained in the image captured by the other image sensor can be accurately identified. Therefore, if the image area on a first side can be extracted, the image area on the other (second) side can be accurately extracted based on the image area extracted from the first side.

Another aspect of at least one embodiment of the invention is a sheet media processing device having the transportation path; a transportation path for conveying sheet media; a first image sensor disposed to the transportation path; a second image sensor disposed to the transportation path downstream from the first image sensor; a storage unit that stores the measured sensor-to-sensor distance between the first image sensor and second image sensor; a first image information reading control unit that causes the first image sensor to capture first image information containing image data for a first side of the sheet medium from a first reading start point that is before the sheet medium reaches the first image sensor; a second image information reading control unit that causes the second image sensor to capture second image information containing image data for a second side of the sheet medium from a second reading start point that is before the sheet medium reaches the second image sensor and is the sensor-to-sensor distance downstream from the first reading start point; a first image information memory that stores the first image information; and a second image information memory that stores the second image information.

By using a measured and stored sensor-to-sensor distance, this aspect of at least one embodiment of the invention can make the coordinates (address) of the starting position of a first-side image in the first image information stored in the first image information memory and the coordinates of the starting position of a second-side image in the second image information stored in the second image information memory coordinates for positions that can be made to correspond even if there is deviation in the sensor-to-sensor distance between the first image sensor and the second image sensor due to error or difference in the parts or assembly. More specifically, the margin at the leading end of both images can be made the same.

By thus using the measured sensor-to-sensor distance, the image information stored in the image information memory areas can be corrected even if there is deviation in the sensor-to-sensor distance between the first image sensor and the second image sensor due to differences or error in the parts or assembly. The area of the check in each image information memory unit can also be identified, and the margins contained in the image information captured by the image sensors and stored in the image information memory can be identified based on the coordinates of predetermined areas from the beginning of each image information memory unit. As a result, the coordinates of the first-side image area contained in the first image information stored in the first image information memory can be identified based on the coordinates of the sensor-to-sensor distance and the second image area contained in the second image information stored in the second image information memory. Based on the coordinates of the sensor-to-sensor distance and the image area on one side, the image area on the other side can therefore be accurately extracted.

The sheet media processing device according to another aspect of at least one embodiment of the invention sets a point after the sheet medium has finished passing (has travelled beyond) the second image sensor as a first reading end point and a second reading end point. The first image information reading control unit causes the first image sensor to capture first image information containing a first side of the sheet medium from the first reading start point to the first reading end point. The second image information reading control unit causes the second image sensor to read second image information containing a second side of the sheet medium from the second reading start point to the second reading end point. An image acquisition unit removes a sensor-to-sensor distance portion of image information from an area not including the first-side image information in the first image information memory.

Control by the control units is easy in this aspect of at least one embodiment of the invention because the first image sensor and second image sensor stop reading at the same time. In addition, even if there is variation in the sensor-to-sensor distance, by using the measured sensor-to-sensor distance the coordinates of the end position of the first-side image in the first image information memory and the coordinates of the end position of the second-side image in the second image information memory can be set to coordinates for positions that can be made to correspond by the image acquisition unit removing the sensor-to-sensor distance portion of image information from the area in the first image information memory not including the captured and stored first-side image information. That is, the margins at the trailing ends can be set to the same area.

In addition, because the margin at the leading end is also set to the coordinates for corresponding areas, the coordinates of the first-side image area and the coordinates of the second-side image area can be accurately identified. Because the leading end margin, the first-side image area, and the trailing end margin in the first image information, and the leading end margin, the second-side image area, and the trailing end margin in the second image information are the same respectively defined areas, the image information can be accurately extracted based on the coordinates of the areas.

Further preferably, the first-side image information in the first image information memory or the second-side image information in the second image information memory is identified by the image acquisition unit extracting image information with at least a prescribed brightness level.

If the sheet medium slips in the transportation path so that the first-side image area in the first image information memory or the second-side image area in the second image information memory shifts, this aspect of at least one embodiment of the invention enables the image acquisition unit to still correctly identify the desired image area based on the brightness of the image area captured from the sheet medium.

In the sheet media processing device according to another aspect of at least one embodiment of the invention, the sensor-to-sensor distance acquired by reading a prescribed sheet medium is stored in the storage unit.

This aspect of at least one embodiment of the invention enables accurately measuring and storing the sensor-to-sensor distance by using a check with no shading or background design printed in at least the leading end portion and trailing end portion of the check, or by using a white or solid color check with no background pattern, to measure the sensor-to-sensor distance.

Further preferably, the sheet media processing device also has a transmission unit for connecting to a host device and sending the first image information and the second image information.

This aspect of at least one embodiment of the invention can send the first image information and the second image information to a computer or other host device by means of the transmission unit.

Further preferably, the sheet media processing device also has an image acquisition unit that extracts image information with at least a prescribed brightness level from the first image information and the second image information, and acquires first-side image information and second-side image information; and a transmission unit for connecting to a host device and sending the first-side image information and the second-side image information.

This aspect of at least one embodiment of the invention can send the first-side image information and the second-side image information to a computer or other host device by means of the transmission unit.

The sheet medium image reading method, sheet media processing device, and sheet media processing system according to at least one embodiment of the invention manage the first reading start point where a first image sensor starts image capture, and a second reading start point where a second image sensor starts image capture, according to a previously measured sensor-to-sensor distance. Therefore, even if there is some variation in the sensor-to-sensor distance between the first image sensor and second image sensor, the margins contained in the images captured by each image sensor can be set to the same predetermined value. In addition, the image area for one side of the sheet medium contained in the image captured by one image sensor, and the image area for the other side of the sheet medium contained in the image captured by the other image sensor, can be accurately aligned. Therefore, if the image area for one side can be accurately extracted, the image area for the other side can be accurately extracted based on the image area in the first side.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8A, FIG. 8B, and FIG. 8C are plan views schematically showing the installation error between the image sensors.

DESCRIPTION OF THE PREFERRED EMBODIMENTS

Preferred embodiments of at least one embodiment of the invention are described below with reference to the accompanying figures using a check processing device by way of example.

*General Configuration

Figure 1A:
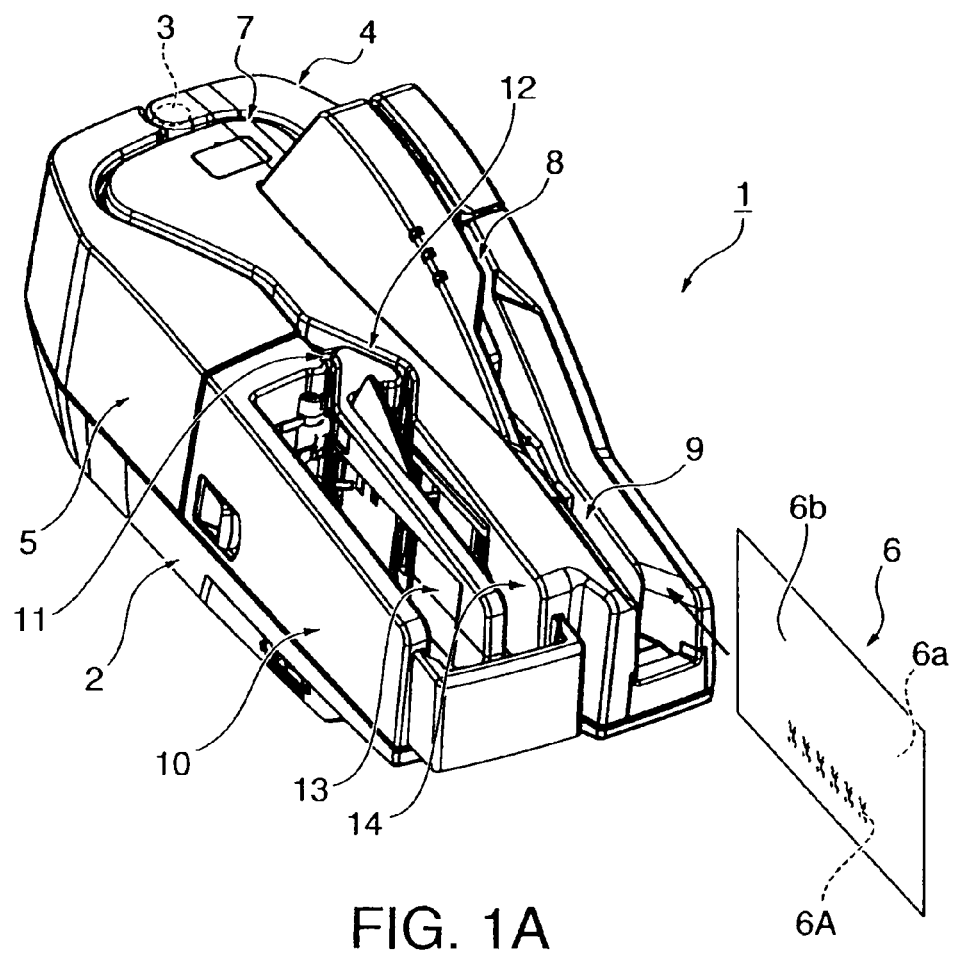
FIG. 1A and FIG. 1B are an oblique view and a plan view, respectively, of a check processing device according to at least one embodiment of the invention.
Figure 1B:
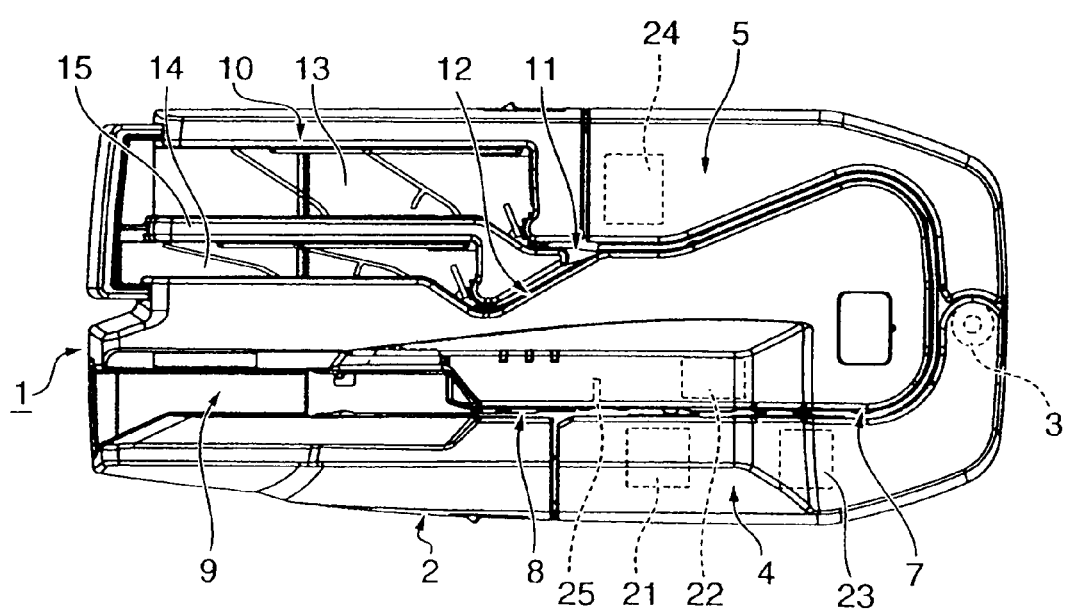

FIG. 1A is an external oblique view and FIG. 1B is a plan view of a check processing device 1 according to a preferred embodiment of the invention.

The check processing device 1 has a case 2 on the main unit and a pair of left and right access covers 4 and 5 that open and close pivoting on a vertical support pin 3 disposed at the back end of the case 2. A check transportation path 7 for conveying checks 6 is formed between the case 2 and the access covers 4 and 5.

The check transportation path 7 is a narrow vertical slot that curves in a basically U-shaped configuration when seen from above. The check transportation path 7 includes in order from the upstream end in the check transportation direction an upstream transportation path portion 8, a curved transportation path portion 9, and a downstream transportation path portion 10.

The upstream end of the upstream transportation path portion 8 is connected to a check supply unit 11, which is a wide vertical channel. The downstream end of the downstream transportation path portion 10 is connected to a check storage unit 12.

The check storage unit 12 has first and second branch paths 13 and 14, which are narrow vertical channels, connected to the downstream end of the downstream transportation path portion 10, and first and second storage pockets 15 and 16 connected to the downstream ends of the first and second branch paths 13 and 14.

A flapper 17 that directs checks 6 discharged from the downstream transportation path portion 10 to the first storage pocket 15 or second storage pocket 16 is located at the junction between the first and second branch paths 13 and 14.

As shown in FIG. 1, each check 6 has an MICR line 6A printed along the long bottom edge on the front 6a of the check 6. Also recorded on the front 6a against a patterned background are the check amount, payer and payee, various numbers, and the payer signature. An endorsement is recorded on the back 6b of the check 6. The checks 6 are loaded in the check supply unit 11 with the tops and bottoms of the checks together and the fronts 6a facing the outside of the substantially U-shaped check transportation path 7.

As indicated by the dotted lines in FIG. 1B, a front contact image sensor (first image sensor) 21 for imaging the fronts 6a of the checks 6, a back contact image sensor (second image sensor) 22 for imaging the backs 6b of the checks 6, a magnetic head 23 for reading the MICR line 6A, and a printing mechanism 24 for printing ELECTRONIC FUNDS TRANSFER, for example, on the check front 6a are disposed in this order from the upstream side of the transportation direction along the check transportation path 7. A paper length detector 25 that recognizes the length from the leading end to the trailing end of the check 6 by detecting the check 6 delivered from the check supply unit 11 is disposed upstream from the front contact image sensor 21 on the upstream transportation path portion 8.

The back contact image sensor 22 and the paper length detector 25 are disposed on the case 2 side, and the front contact image sensor 21 and magnetic head 23 are disposed on the cover 4 side.

After a check 6 is delivered from the check supply unit 11, the front and back sides of the check 6 are imaged and the magnetic ink character line 6A printed on the check front 6a is read as the check 6 travels through the check transportation path 7. If the information is read correctly, ELECTRONIC FUNDS TRANSFER or other information is printed on the check 6, and the check 6 is directed by the flapper 17 to the first storage pocket 15 and stored in the first storage pocket 15. Checks 6 that cannot be scanned or read correctly are not printed and are diverted to and stored in the second storage pocket 16.

*Internal Construction

Figure 2:
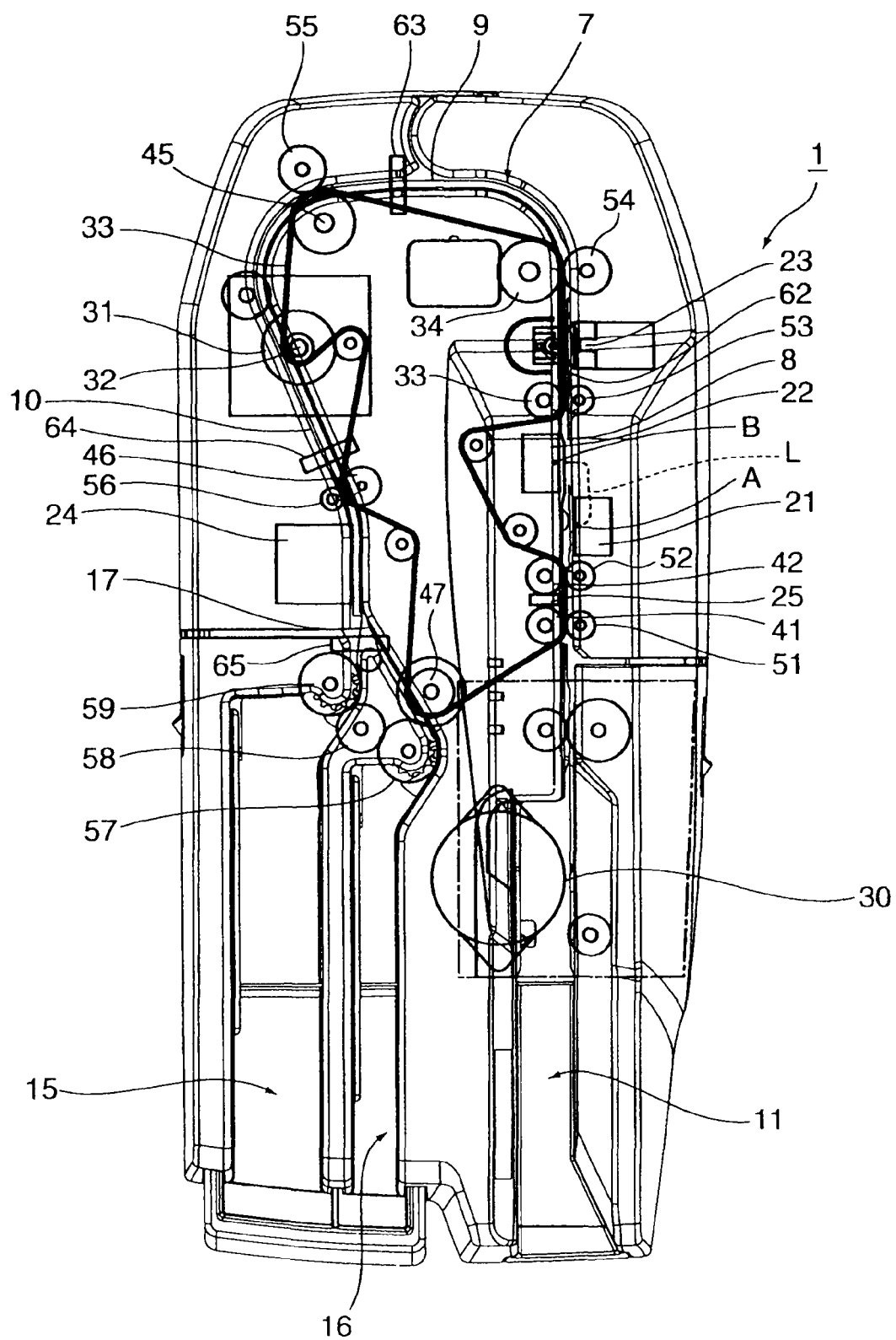
FIG. 2 shows the internal configuration of the check processing device.

FIG. 2 describes the internal configuration of the check processing device 1.

The check supply unit 11 has a check separating and feeding mechanism with a check feeding motor 30 for feeding the checks 6 that are loaded in a bunch into the check supply unit 11 one at a time into the check transportation path 7.

The transportation mechanism for conveying the checks 6 along the check transportation path 7 includes a stepping motor as a transportation motor 31, a drive pulley 32 mounted on the rotating shaft of the transportation motor 31, a set of transportation rollers 41 to 47 disposed along the check transportation path 7, and a set of pressure rollers 51 to 57 that are pressed against and rotate in conjunction with the transportation rollers 41 to 47.

Rotation of pressure roller 57, which is also the discharge roller of the second storage pocket 16, is transferred through a transfer gear 58 to the discharge roller 59 of the first storage pocket 15.

The transportation mechanism also has an endless belt 33 for transferring rotation of the transportation motor 31 shaft to the transportation rollers 41 to 47, and thus transfers power to the transportation rollers 41 to 47.

Transportation rollers 41 to 44 are disposed at the upstream end and middle of the upstream-side transportation path portion 8, and near where the upstream-side transportation path portion 9 connects to the curved transportation path portion 9. Transportation roller 46 is in the middle of the downstream-side transportation path portion 10, and transportation roller 47 is located at the discharge opening into the second storage pocket 16. Discharge roller 59 is disposed at the discharge opening into the first storage pocket 15.

The front contact image sensor 21 and the back contact image sensor 22 are disposed between the transportation rollers 42 and 43 on opposite sides of the upstream transportation path portion 8 offset from each other in the transportation direction. A magnetic head 23 for magnetic ink character reading is disposed between transportation rollers 43 and 44.

A printing mechanism 24 is disposed on the downstream side of the transportation roller 46 in the downstream-side transportation path portion 10. The printing mechanism 24 can move between a printing position applying pressure to the check 6 and a standby position retracted from this printing position by means of a drive motor (not shown in the figure).

Various sensors for check 6 transportation control are also disposed to the check transportation path 7.

The paper length detector 25 is located between transportation rollers 41 and 42.

A multifeed detector 62 for detecting if two or more checks 6 are being fed together (also referred to as a multifeed condition) is located opposite the magnetic head 23.

A jam detector 63 is located at a position on the upstream side of the transportation roller 45. A check is known to be jammed in the check transportation path 7 if the jam detector 63 detects a check 6 continuously for a prescribed time or longer.

A print detector 64 for detecting the presence of a check 6 to be printed by the print mechanism 24 is located on the upstream side before the transportation roller 46.

A discharge detector 65 for detecting checks 6 discharged into the first and second storage pockets 15 and 16 is disposed where the first and second branch paths 13 and 14 branch from the downstream transportation path portion 10 to the first and second storage pockets 15 and 16.

A flapper 17 that is driven by a drive motor not shown to switch the discharge path is disposed where the first and second branch paths 13 and 14 diverge. The flapper 17 selectively switches the connection of the downstream end of the downstream transportation path portion 10 to the first and second storage pockets 15 and 16, and guides the check 6 to the selected storage pocket.

*Control System

Figure 3:
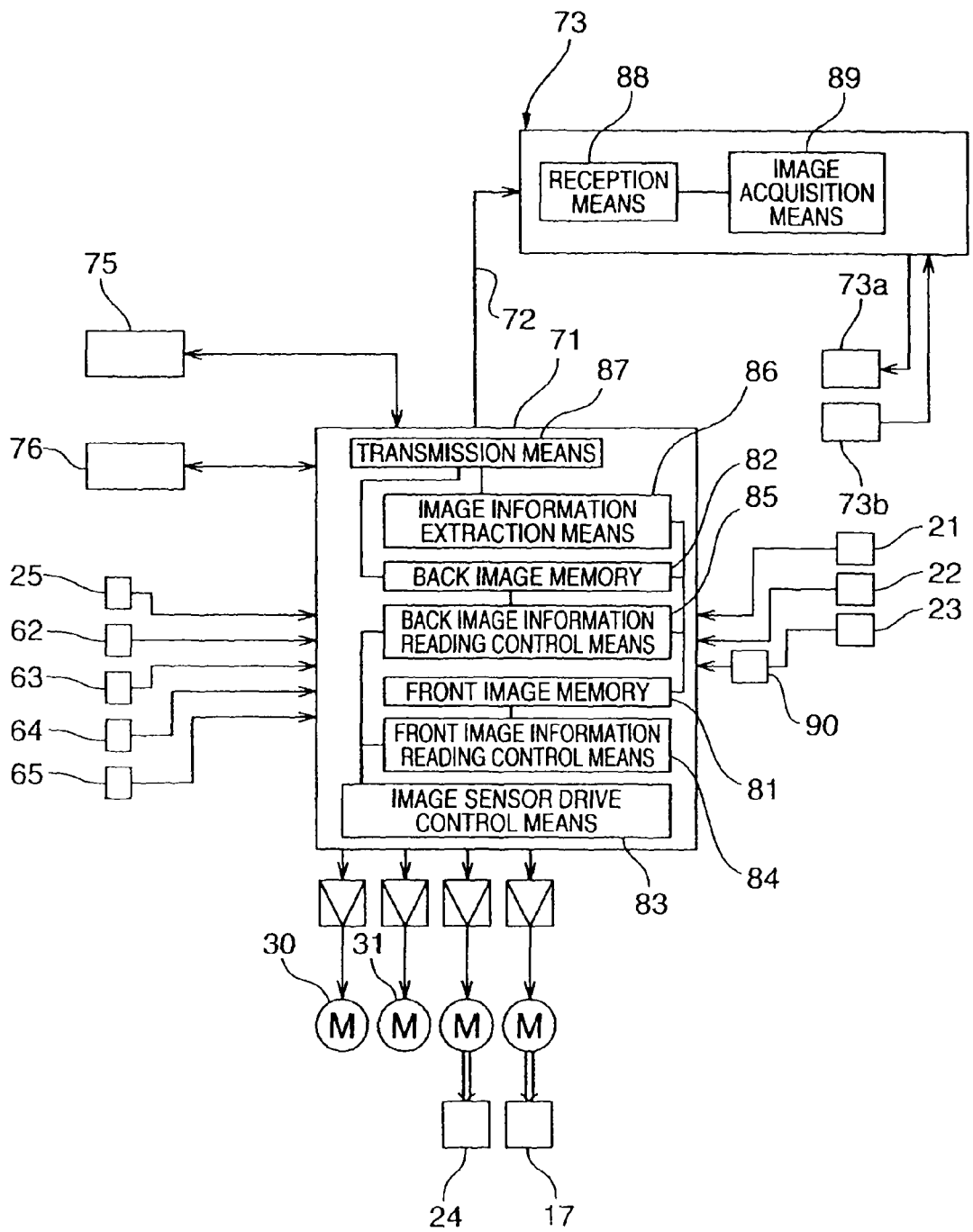
FIG. 3 is a schematic block diagram showing the control system of the check processing device.

FIG. 3 is a schematic block diagram showing the control system of the check processing device 1. The control system of the check processing device 1 has a control unit 71 that includes a CPU and memory such as ROM or RAM. The control unit 71 is connected to a host computer 73 by a communication cable 72.

The computer 73 has a display 73*a* and input/output devices such as a keyboard, mouse, or other operating unit 73*b*, and commands such as a start command for the check reading operation are input from the computer 73 to the control unit 71.

When a command to start reading is received, the control unit 71 drives the check feeding motor 30 to feed the checks 6 one at a time from the check supply unit 11 into the check transportation path 7 and convey the checks 6 fed by driving the transportation motor 31 through the check transportation path 7.

The information read by the front contact image sensor 21, the back contact image sensor 22, and the magnetic head 23 is input to the control unit 71. Detection signals from the paper length detector 25, multifeed detector 62, jam detector 63, printing detector 64, and discharge detector 65 disposed along the check transportation path 7 are also input. The control unit 71 controls transportation of the check 6 based on these detection signals.

An operating unit 75 and flash memory 76 are also connected to the control unit 71. The operating unit 75 is disposed to the case 2 and includes a power switch and other operating switches. The flash memory 76 stores the sensor-to-sensor distance L, which is acquired by measuring the distance L (see FIG. 2) between the image reading position A of the front contact image sensor 21 and the image reading position B of the back contact image sensor 22.

The control unit 71 may start processing a check 6 when the operator operates a particular switch on the operating unit 75.

The front contact image sensor 21 scans at image reading position A and sequentially outputs each line of scanned data to the control unit 71. The control unit 71 stores the time series image data input from the front contact image sensor 21 to the front image memory (first image information memory) 81 as the front-side image data (first image data).

The back contact image sensor 22 scans at image reading position B and sequentially outputs each line of scanned data to the control unit 71. The control unit 71 stores the time series image data input from the back contact image sensor 22 to the back image memory (second image information memory) 82 as the back-side image data (second image data).

The control unit 71 includes an image sensor drive control unit 83, a front image information reading control unit 84, and a back image memory 85.

The image sensor drive control unit 83 switches the front contact image sensor 21 and back contact image sensor 22 between an on state in which imaging is enabled, and an off state in which imaging is disabled.

The front image information reading control unit 84 controls starting and stopping the imaging operation of the front contact image sensor 21.

The back image memory 85 controls starting and stopping the imaging operation of the back contact image sensor 22.

The control unit 71 also has an image information extraction unit 86, which functions as the image acquisition unit of the check processing device 1. In order to align the area of the back image information contained in the back-side image data and the area of the front image information contained in the front-side image data, the image information extraction unit 86 extracts a predetermined area from the front-side image data as third image data (the first image data minus the sensor-to-sensor distance part).

The third image data extracted by the image information extraction unit 86 and the back-side image data are supplied through a transmission unit 87 to the computer 73.

The computer 73 has a reception unit 88 and an image acquisition unit 89.

The reception unit 88 receives the third image data and the back-side image data.

The image acquisition unit 89 extracts the back image information from the back-side image data, and based on the coordinates of the back image information contained in the back-side image data extracts the front image information (first-side image) from the front-side image data. When the image acquisition unit 89 extracts the back image information (second-side image) and the front image information (first-side image), the images are stored as electronic data of equal value to the actual check.

These functions can also be rendered in the image information extraction unit 86 of the check processing device 1, in which case the extracted back image information and front image information are sent through the transmission unit 87 to the computer 73.

The magnetic head 23 outputs the electromotive force produced by the change in the magnetic field generated when the MICR line 6A passes the magnetic ink character reading operation as the detection signal. The detection signal is input through the signal processing circuit 90 whereby the signal is converted to a digital signal after amplification and waveshaping, and the digital signal is then input to the control unit 71.

The input data from the magnetic head 23 is supplied through the transmission unit 87 to the computer 73 for character recognition and determining if the data was read correctly. Based on the result, the control unit 71 controls driving the printing mechanism 56 and flapper 17, and directs the read check 6 into the first or second storage pocket 15, 16.

*Reading the Front-Side Image Data and Back-Side Image Data

Figure 4:
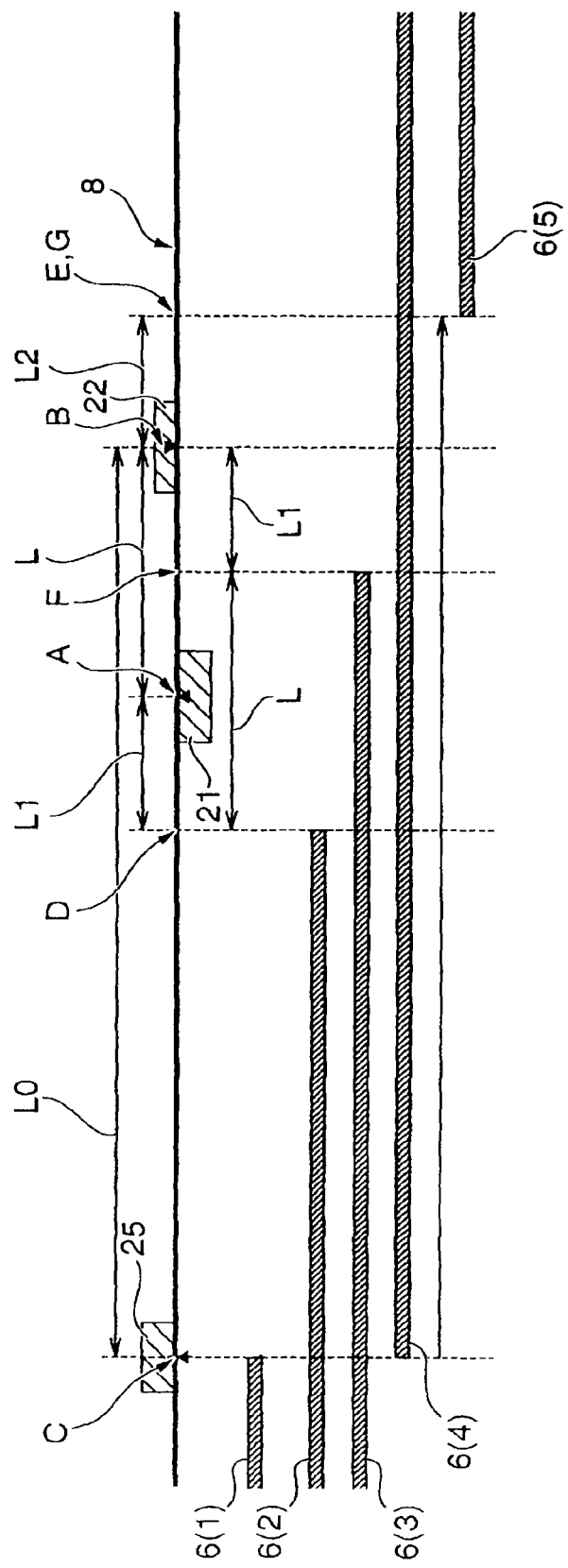
FIG. 4 is a schematic plan view showing the upstream transportation path portion.

FIG. 4 is a schematic plan view of the upstream transportation path portion 8, and shows the detection point C of the paper length detector 25, the first reading start point D and the first reading end point E where the front contact image sensor 21 respectively starts reading and stops reading, and the second reading start point F and the second reading end point G where the back contact image sensor 22 respectively starts reading and stops reading.

In order to prevent being unable to read the leading end part or the trailing end part of the conveyed check 6 and thus failing to capture part of the front image information or back image information, the front image information reading control unit 84 and back image information reading control unit 85 cause the contact image sensors 21 and 22 to read from a point before the check 6 reaches the image reading position A or B of the contact image sensors 21 and 22 and to a point after the check 6 passes the image reading position A or B.

The distance from the detection point C of the paper length detector 25 to the image reading position B of the back contact image sensor 22 is reference length L0, which the front image information reading control unit 84 and back image information reading control unit 85 determine from the number of steps the stepping motor used as the transportation motor 31 has been driven to convey the check 6 when the check 6 reaches each point.

The first reading start point D where the front contact image sensor 21 starts imaging is the point (check point 6(2)) that the leading end of the check 6 reaches after travelling a distance equal to the reference length L0 minus the sum of the sensor-to-sensor distance L and a first margin length L1 from detection point C (check point 6(1)).

The first reading end point E where the front contact image sensor 21 stops imaging is the point (check point 6(5)) that the check 6 reaches after travelling a distance equal to the reference length L0 plus a second margin length L2 from the detection point C (check point 6(4)) where the paper length detector 25 detects the trailing end of the check 6.

The second reading start point F where the back contact image sensor 22 starts imaging is the point (check point 6(3)) that the check 6 reaches after travelling the sensor-to-sensor distance L from the point (check point 6(2)) after the leading end of the check 6 reaches the first reading start point D.

The second reading end point G where imaging starts is the point (check point 6(5)) the check 6 reaches after travelling the distance reference length L0 plus second margin length L2 from the detection point C (check point 6(4)) where the paper length detector 25 detects the trailing end of the check 6.

Note that the first reading end point E of the front contact image sensor 21 and the second reading end point G of the back contact image sensor 22 are the same point.

The sensor-to-sensor distance L is a unique value measured for each check processing device 1, and is written and stored to flash memory 76 when the check processing device is shipped. The first margin length L1 and second margin length L2 are equal.

The image sensor drive control unit 83 turns the front contact image sensor 21 and back contact image sensor 22 on at the first reading start point D (check point 6(2)) where the front contact image sensor 21 starts imaging, and turns the front contact image sensor 21 and back contact image sensor 22 off at the first and second reading start points D and G (check point 6(5)) where the front contact image sensor 21 and back contact image sensor 22 stop imaging.

*Extracting the Front Image Information and Back Image Information

Figure 5A:
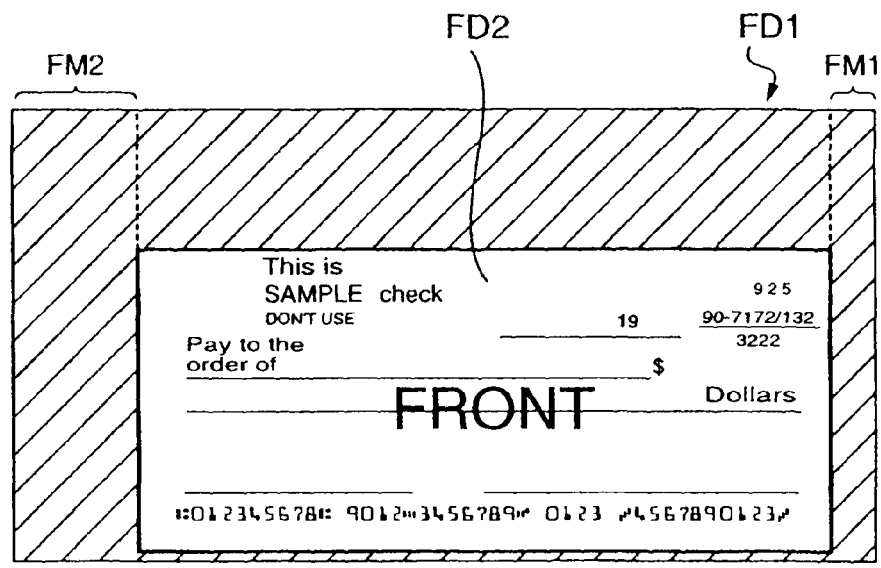
FIG. 5A and FIG. 5B schematically show the image information written to image memory.
Figure 5B:
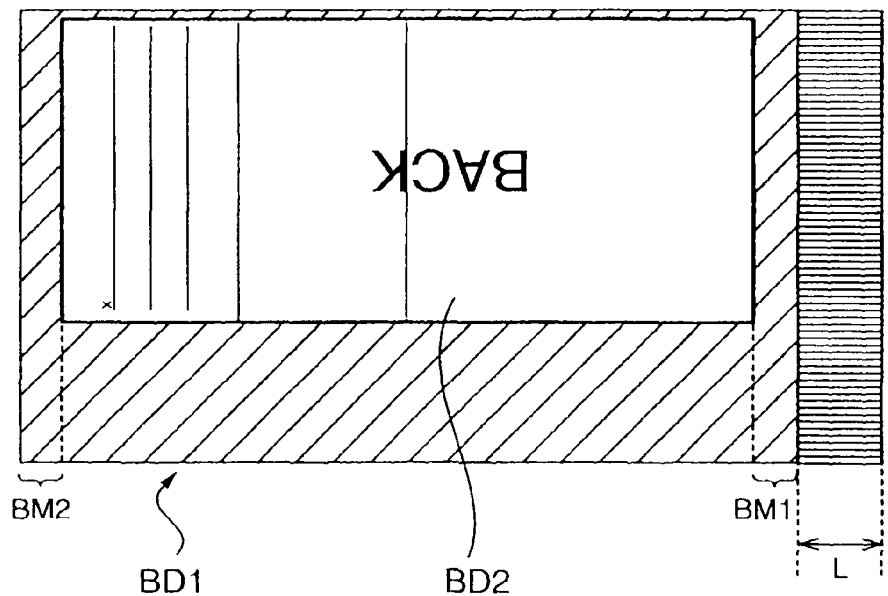

FIG. 5A and FIG. 5B are schematic diagrams of the front-side image data FD1 stored as a two-dimensional image in the front image memory 81, and the back-side image data BD1 stored as a two-dimensional image in the back image memory 82. FIG. 5A shows the front-side image data FD1 and FIG. 5B shows the back-side image data BD1. In order to match the time series at which the front-side image data FD1 was written to the front image memory 81 with the time series at which the back-side image data BD1 was written to the back image memory 82 from the right side in the figures, the back-side image data BD1 written to the back image memory 82 is inverted top and bottom.

The front contact image sensor 21 starts reading from the first reading start point D, which is the first margin length L1 upstream from the image reading position A. As a result, a leading end margin FM1 (equal to L1) is added to the front-side image data FD1 written to front image memory 81. This leading end margin FM1 is equal in length to the margin of first margin length L1 at the leading end of the front image of the check 6.

The front contact image sensor 21 continues writing the front-side image data FD1 to the front image memory 81 until the trailing end of the check 6 reaches the first reading end point E after passing the image reading position A of the front contact image sensor 21. As a result, a trailing end margin FM2 (equal to L+L2) is added to the trailing end of the front image information FD2 of the check 6 written to the front image memory 81. This trailing end margin FM2 is equal in length to the sensor-to-sensor distance L plus the second margin length L2.

The back contact image sensor 22 starts reading from the second reading start point F, which is the position the leading end of the check 6 reaches after travel the sensor-to-sensor distance L from the first reading start point D. Therefore, as shown in FIG. 5B, the back-side image data BD1 is not written to the back image memory 82 while the check 6 travels sensor-to-sensor distance L, and a leading end margin BM1 (equal to L1) is added to the leading end of the back image information BD2 of the check 6 written to the back image memory 82. This leading end margin BM1 is equal in length to the first margin length L1, and is also equal to the leading end margin FM1 of the front-side image data FD1.

The back contact image sensor 22 continues writing the back-side image data BD1 to the back image memory 82 until the trailing end of the check 6 reaches the second reading end point G after passing the image reading position B of the back contact image sensor 22. As a result, a trailing end margin BM2 (equal to L2) is added to the trailing end of the back image information BD2 of the check 6 written to back image memory 82. This trailing end margin BM2 is equal in length to the second margin length L2.

Figure 6A:
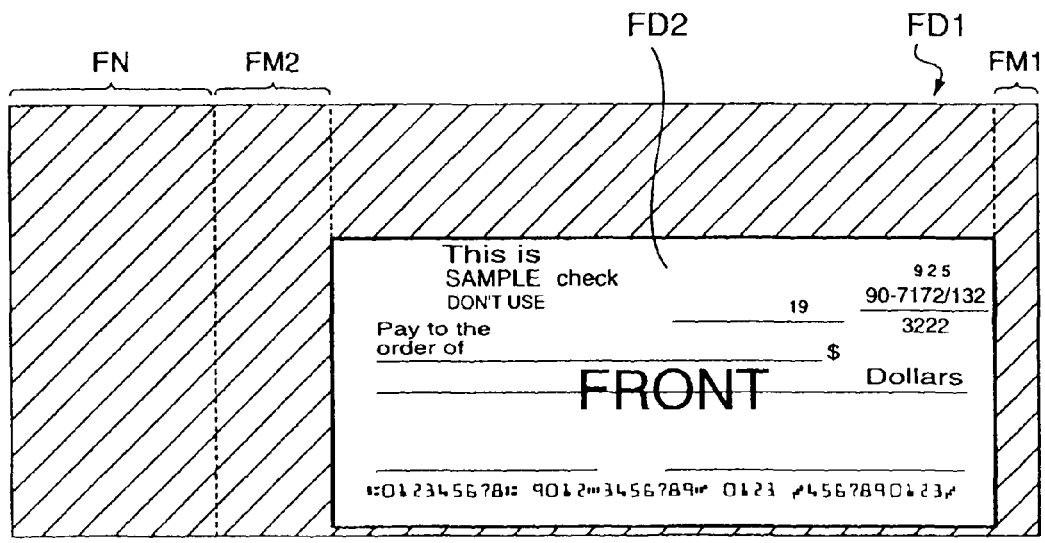
FIG. 6A and FIG. 6B schematically show the image information written to image memory.
Figure 6B:
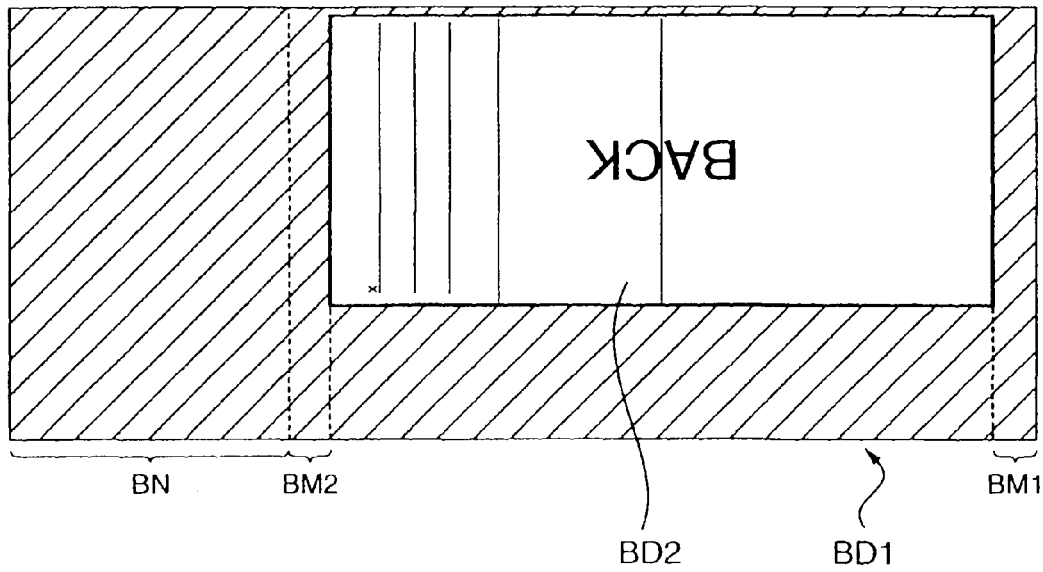

FIG. 6A and FIG. 6B schematically show the front-side image data FD1 written to the front image memory 81 and the block diagram written to the back image memory 82 with the leading ends thereof aligned at the right end. FIG. 6A shows the front-side image data FD1 and FIG. 6B shows the back-side image data BD1. The back-side image data BD1 written to the back image memory 82 is inverted top and bottom.

As shown in FIG. 6A and FIG. 6B, when the leading ends of the front-side image data FD1 and back-side image data BD1 are aligned, the trailing end margins FM2 and BM2 differ, but the position of the front image information FD2 contained in the front-side image data FD1 and the position of the back image information BD2 contained in the back-side image data BD1 are the same. Note that the area on the trailing end side of the trailing end margins FM2 and BM2 are an unused area FN in the front image memory 81 and an unused area BN in the back image memory 82.

The image information extraction unit 86 then extracts the data area corresponding to the two-dimensional domain containing the back image information BD2 in the back image memory 82 from the beginning of the two-dimensional domain containing the front image information FD2 in the front image memory 81, and creates third image information FD3. This third image information FD3 removes the image information in the area equal to sensor-to-sensor distance L from the trailing end margin FM2. As a result, the position of the front image information FD2 contained in the extracted third image information FD3 and the position of the back image information BD2 contained in the back-side image data BD1 match completely. The leading end margin and the trailing end margin also match perfectly.

Figure 7A:
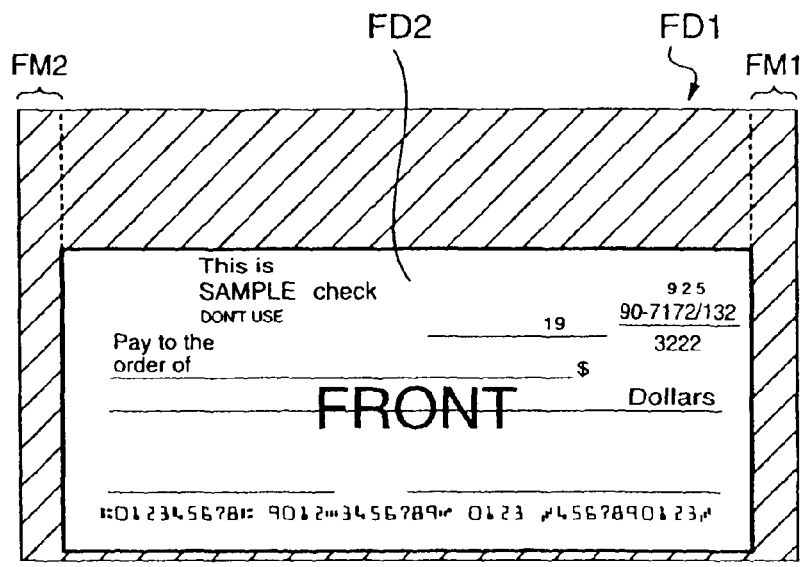
FIG. 7A and FIG. 7B schematically show the image information written to image memory.
Figure 7B:
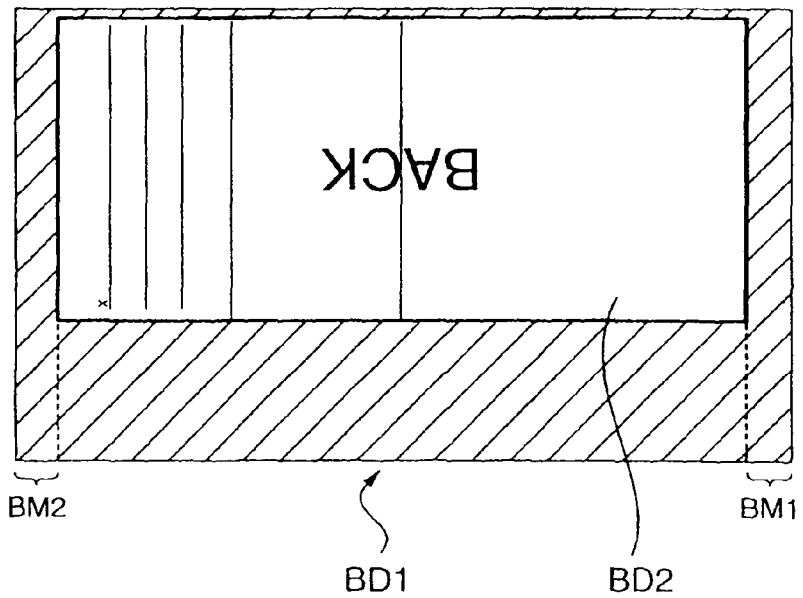

FIG. 7A and FIG. 7B schematically show the match between the front image information FD2 contained in the third image information FD3 extracted from the front-side image data FD1, and the back image information BD2 contained in the back-side image data BD1. The back-side image data BD1 written to the back image memory 82 is inverted top and bottom.

The back-side image data BD1 and the third image information FD3 are then sent to the computer 73. The back-side image data BD1 includes the back image information BD2 and the darker image data surrounding the back image information BD2. Because a decorative background is rarely printed on the back of a check 6, the image acquisition unit 89 can accurately extract the back image information BD2 by applying an image process that extracts the part of the back-side image data BD1 containing image data with a brightness value equal to or greater than a predetermined level. The image information extraction unit 86 of the check processing device 1 can alternatively perform this function.

Because the position of the back image information BD2 contained in the back-side image data BD1, and the position of the front image information FD2 contained in the front-side image data FD1 contained in the third image information FD3, are perfectly aligned, the front image information FD2 can be accurately acquired by extracting the front image information FD2 from the third image information FD3 based on the coordinates of the back image information BD2 acquired when extracting the back image information BD2 from the back-side image data BD1.

These functions can be rendered in the image information extraction unit 86 of the check processing device 1. In this situation the acquired back image information BD2 and front image information FD2 are supplied through the transmission unit 87 to the computer 73.

The extracted back image information BD2 and front image information FD2 are then stored in the computer 73 as electronic images (digital data) of equal value to the actual check.

*When There is Deviation in the Distance Between the Contact Image Sensors

Reading the front-side image data FD1 and back-side image data BD1 when there is deviation in the positions of the contact image sensors 21 and 22 and the sensor-to-sensor distance varies is described next with reference to FIG. 8A, FIG. 8B, and FIG. 8C.

FIG. 8A shows the first reading start point D, first reading end point E, second reading start point F, and second reading end point G when there is no deviation in the installation positions.

FIG. 8B shows the first reading start point D, first reading end point E, second reading start point F, and second reading end point G when the image sensor installation results in a shorter sensor-to-sensor distance L.

FIG. 8C shows the first reading start point D, first reading end point E, second reading start point F, and second reading end point G when the image sensor installation results in a longer sensor-to-sensor distance L.

As described above, the front image information reading control unit 84 causes the front contact image sensor 21 to start reading when the leading end of the check 6 reaches a first reading start point D that is a first margin length L1 upstream from the image reading position A of the front contact image sensor 21.

The back image information reading control unit 85 causes the back contact image sensor 22 to start reading when the leading end of the check 6 is conveyed the sensor-to-sensor distance L from the first reading start point D to a second reading start point F.

Because the back image information reading control unit 85 manages when the second reading start point F is reached from the first reading start point D based on the previously measured sensor-to-sensor distance L, the second reading start point F will always be a first margin length L1 upstream from the print buffer of the back contact image sensor 22 as shown in FIG. 8B and FIG. 8C even if the distance between the front contact image sensor 21 and back contact image sensor 22 varies.

As a result, the leading end margin FM1 in the front-side image data FD1 and the leading end margin BM1 in the back-side image data BD1 will be image areas with the same margin. Therefore, if the image information extraction unit 86 extracts the third image information FD3, the position of the back image information BD2 contained in the back-side image data BD1 and the position of the front image information FD2 contained in the third image information FD3 will match precisely.

*Measuring the Sensor-to-Sensor Distance

The sensor-to-sensor distance L between the front contact image sensor 21 and back contact image sensor 22 can be determined by measuring the distance with a gauge after the image sensors are installed to the case 2. The stored value can then be stored in the front image memory 81 or the back image memory 82, or in a separate storage unit in the check processing device 1.

Alternatively, a check-like sheet that is white on both front and back can be conveyed through the check transportation path 7, and the sensor-to-sensor distance L can be determined based on the front-side image data FD1 and back-side image data BD1 acquired from the front contact image sensor 21 and back contact image sensor 22. This check-like sheet is not limited to white, and can be any patternless sheet or a sheet that at least does not have any shading or background design printed in the leading end portion or trailing end portion.

More specifically, a sheet is conveyed through the check transportation path 7, the front contact image sensor 21 captures the front-side image data FD1 from first reading start point D to first reading end point E, and writes the result as a two-dimensional image in the front image memory 81.

The back contact image sensor 22 also captures the back-side image data BD1 from first reading start point D to first reading end point E, and writes the result as a two-dimensional image in the back image memory 82.

If the front-side image data FD1 captured in the front image memory 81 and the back-side image data BD1 captured in the back image memory 82 are then compared, the leading end of the back-side image data BD1 in the back image memory 82 will be offset from the leading end of the front-side image data FD1 in the front image memory 81 by a coordinate amount equal to the sensor-to-sensor distance L. The sensor-to-sensor distance L can therefore be calculated from this offset.

Effect of the Embodiment

This embodiment of at least one embodiment of the invention manages the first reading start point D at which the front contact image sensor 21 starts imaging and the second reading start point F at which the back contact image sensor 22 starts imaging based on a previously measured sensor-to-sensor distance L. As a result, even if there is deviation in the distance L between the contact image sensors 21 and 22, the first reading start points D and F of the contact image sensors 21 and 22 will be a first margin length L1 upstream from the image reading position A and B of the contact image sensors 21 and 22, and the size of the leading end margin FM1, BM1 contained in the images captured by the contact image sensors 21 and 22 will be the same.

The beginning of the front image information FD2 contained in the front-side image data FD1 and the beginning of the back image information BD2 contained in the back-side image data BD1 can therefore be aligned. Because the coordinates of the front image information contained in the two-dimensional front-side image data FD1 written to front image memory 81, and the coordinates of the back image information contained in the two-dimensional back-side image data BD1 written to the back image memory 82, therefore correspond, the image information for one side can be accurately extracted based on the coordinates of the image information for the other side.

If third image information FD3 is created by extracting the data area corresponding to the information area of the back-side image data BD1 in the back image memory 82 from the beginning of the information area of the front-side image data FD1 in the front image memory 81, the positions of the front image information FD2 contained in the third image information FD3 and the back image information BD2 contained in the back-side image data BD1 will match completely.

Furthermore, because the front image information FD2 is extracted from the third image information FD3 based on the coordinates of the back-side image data BD1 contained in the back image information BD2, which usually does not contain any decoration, the front image information FD2 can be extracted without losing any part thereof.

In addition, because the image sensor drive control unit 83 simultaneously controls the on and off state of the front contact image sensor 21 and back contact image sensor 22, controlling driving the image sensors is easier than when the contact image sensors 21 and 22 are driven separately.

Furthermore, because the front image information reading control unit 84 and back image information reading control unit 85 are installed on the case 2 side, and when the conveyed check 6 reaches specific points is managed based on the reference length L0 between the back contact image sensor 22 and the paper length detector 25, which is not subject to deviation in its position, there is no deviation in the first reading start point D and second reading start point F.

Other Embodiments of at Least One Embodiment of the Invention

The distance from the detection point C of the paper length detector 25 to the back contact image sensor 22 is used as the reference length L0 for conveying the checks 6 in the embodiment described above, but if the paper length detector 25 and front contact image sensor 21 are installed to the cover 4, the distance from the detection point C where the paper length detector 25 detects the leading end of the check 6 to the front contact image sensor 21 can be used as the reference length L0. In this case, the first reading start point D is the position of the leading end of the check 6 when the check 6 has been conveyed the reference length L0 minus the first margin length L1 from the detection point C; the second reading start point F is the position of the leading end of the check 6 after travelling the sensor-to-sensor distance L downstream from the first reading start point D; and the first and second reading end points E and G are the position of the trailing end of the check 6 after travelling the reference length L0 plus the sensor-to-sensor distance L plus the second margin length L2 downstream from the detection point C.

The first reading end point E of the front contact image sensor 21 is the same point as the second reading end point G of the back contact image sensor 22 in the embodiment described above, but could be the point reached by the trailing end of the check 6 after travelling a distance equal to the reference length L0 plus the second margin length L2 downstream from the detection point C of the paper length detector 25. In this situation the position of the front image information FD2 contained in the front-side image data FD1 can be made to match the position of the back image information BD2 contained in the back-side image data BD1 without creating the third image information FD3 by extracting the data area corresponding to the information area of the front-side image data FD1 from the beginning of the back-side image data BD1.

In addition, the coordinates of the front image information FD2 contained in the two-dimensional front-side image data FD1 written to the front image memory 81 and the coordinates of the back image information BD2 contained in the two-dimensional back-side image data BD1 written to the back image memory 82 will correspond without creating the third image information FD3 by extracting the data area for the information domain of the front-side image data FD1 from the beginning of the back-side image data BD1. Therefore, the front-side image data FD1 and the back-side image data BD1 can be sent to the computer 73, and the image acquisition unit 89 can extract the back image information BD2 from the back-side image data BD1 and extract the front image information FD2 from the front-side image data FD1 based on the coordinates of the back image information BD2 contained in the back-side image data BD1.

The image sensor drive control unit 83 simultaneously switches the front contact image sensor 21 and back contact image sensor 22 on and off, but could turn the back contact image sensor 22 on from the second reading start point F.

The front contact image sensor 21 is on the upstream side of the transportation direction and the back contact image sensor 22 is on the downstream side in the embodiment described above, but this configuration can be reversed. In this configuration the third image information FD3 is created by extracting the data corresponding to the information range of the front-side image data FD1 from the beginning of the back-side image data BD1. The back image information BD2 is then extracted from the third image information FD3, and the front image information FD2 is extracted from the front-side image data FD1 based on the coordinates of the back image information BD2 contained in the third image information FD3. This configuration thus also enables extracting the front image information based on the coordinates of the back image information that contains little decoration.

The front image information is extracted based on the coordinates of the back image information in the foregoing examples, but if the sheet medium has little decoration printed on the front, the back image information can be extracted based on the coordinates of the front image information.

The image acquisition unit 89 is rendered in the computer in the foregoing embodiments, but can be disposed to the check processing device instead. In this configuration the front image information FD2 and the back image information BD2 are sent to the computer after being extracted on the check processing device side, and the front image information FD2 and back image information BD2 are stored on the computer side. Other check processing operations executed by the computer can also be executed by the check processing device.

At least one embodiment of the invention being thus described, it will be obvious that it may be varied in many ways. Such variations are not to be regarded as a departure from the spirit and scope of at least one embodiment of the invention, and all such modifications as would be obvious to one skilled in the art are intended to be included within the scope of the following claims.

What is claimed is:

1. An image reading method for sheet media, comprising steps of:
   measuring and storing a sensor-to-sensor distance between a first image sensor disposed to a transportation path in which the sheet medium is conveyed and a second image sensor disposed to the transportation path downstream from the first image sensor;
   setting a point before a sheet medium reaches the first image sensor as a first reading start point;
   setting a point that is before the sheet medium reaches the second image sensor and is after the sheet medium is conveyed the sensor-to-sensor distance from the first reading start point as a second reading start point;
   setting a point after the sheet medium has finished passing the second age sensor as a first reading end point and a second reading end point,
   capturing first image information containing a first side of the sheet medium from the first reading start point to the first reading end point by means of the first image sensor;
   capturing second image information containing a second side of the sheet medium from the second reading start point to the second reading end point by means of the second image sensor; and
   removing a sensor-to-sensor distance portion of image information from an area not including first-side image information in the first image information.

2. The image reading method for sheet media described in claim 1, wherein:
   the sensor-to-sensor distance is measured by reading a prescribed sheet medium.

3. The image reading method for sheet media described in claim 1, wherein:
   the first-side image information in the first image information or second-side image information in the second image information is identified by extracting image information with at least a prescribed brightness level.

4. A sheet media processing device comprising:
   a transportation path for conveying sheet media;
   a first image sensor disposed to the transportation path;
   a second image sensor disposed to the transportation path downstream from the first image sensor;
   a storage unit that stores a measured sensor-to-sensor distance between the first image sensor and the second image sensor;
   a first image information reading control unit that causes the first image sensor to capture first image information containing image data for a first side of a sheet medium from a first reading start point that is before the sheet medium reaches the first image sensor to a first reading end point that is after the sheet medium has finished passing the second image sensor;
   a second image information reading control unit that causes the second image sensor to capture second image information containing image data for a second side of the sheet medium from a second reading start point that is before the sheet medium reaches the second image sensor and is the sensor-to-sensor distance downstream from the first reading start point to a second reading end point that is after the sheet medium has finished passing the second image reading sensor;
   a first image information memory that stores the first image information;
   a second image information memory that stores the second image information; and
   an image acquisition unit that removes a sensor-to-sensor distance portion of image information from an area not including first-side image information in the first image information memory.

5. The sheet media processing device described in claim 4, further comprising:
   a transmission unit for connecting to a host device and sending the first image information and the second image information.

6. The sheet media processing device described in claim 4, wherein:
   the image acquisition unit that extracts image information with at least a prescribed brightness level from the first image information and the second image information, and acquires the first-side image information and second-side image information; the sheet media processing device further comprising:
   a transmission unit for connecting to a host device and sending the first-side image information and the second-side image information.

7. The sheet media processing device described in claim 4, wherein:
   the first-side image information in the first image information memory or second-side image information in the second image information memory is identified by the image acquisition unit extracting image information with at least a prescribed brightness level.

8. The sheet media processing device described in claim 4, wherein:
   the sensor-to-sensor distance acquired by reading a prescribed sheet medium is stored in the storage unit.

* * * * *